United States Patent [19]
Quistorff et al.

[11] Patent Number: 6,101,304
[45] Date of Patent: Aug. 8, 2000

[54] AIR BLOWN FIBER (ABF) TUBE CABLE WITH CENTRAL INNERDUCT

[75] Inventors: Keith Quistorff; Thomas E. Stammely, both of Cary, N.C.; Eugene D. Bonnes, Mentor, Ohio

[73] Assignee: Sumitomo Electric Lightwave Corp., Research Triangle Park, N.C.

[21] Appl. No.: 09/181,112

[22] Filed: Oct. 28, 1998

[51] Int. Cl.[7] .................................................. G02B 6/44
[52] U.S. Cl. .......................................................... 385/109
[58] Field of Search .................................. 385/100–109, 385/147; 264/1.29, 112, 120, 257, 258, 517, 522

[56] References Cited

U.S. PATENT DOCUMENTS

| | | | |
|---|---|---|---|
| 4,609,519 | 9/1986 | Pichard et al. | 264/510 |
| 4,678,581 | 7/1987 | Nogi et al. | 210/500.23 |
| 4,997,256 | 3/1991 | Sano et al. | 385/102 |
| 5,109,456 | 4/1992 | Sano et al. | 385/100 |
| 5,970,195 | 10/1999 | Brown | 385/100 |

*Primary Examiner*—Akm E. Ullah
*Attorney, Agent, or Firm*—Jenkins & Wilson, P.A.

[57] ABSTRACT

A fiber optic cable assembly with enhanced flexibility and reduced installation cost in contrast to conventional multiple duct systems. The fiber optic cable assembly comprises a central innerduct adapted to provide a pathway for installing conventional cable by pulling of the cable therethrough. A plurality of air blown fiber (ABF) tubes are positioned around the circumference of the central innerduct for installing air blown optical fiber bundles therethrough, and a plurality of strength elements are provided around the circumference of the central innerduct and interposed among the plurality of air blown fiber (ABF) tubes. A layer of water-blocking material is provided between an outer jacket and the air blown fiber (ABF) tubes and strength members.

15 Claims, 1 Drawing Sheet ns to install conven-tional duct systems.

AIR BLOWN FIBER (ABF) TUBE CABLE WITH CENTRAL INNERDUCT

TECHNICAL FIELD

The present invention relates to air blown fiber (ABF) tube cables. More particularly, the invention relates to an air blown fiber tube cable assembly with a central innerduct for receiving pulled conventional cable and a plurality of air blown fiber (ABF) tubes positioned around the central innerduct for receiving air blown optical fiber bundles therethrough.

RELATED ART

The high costs associated with installing duct systems capable of supporting installation of multiple cabling systems and/or providing cabling system upgrade capability are prohibitive in many cable installation scenarios. Conventional installation methods include boring or direct burial of conduits and innerducts to create pathways for pulling cables as needed to support existing and new media types.

Conventional duct system installation costs are extremely high due to the labor and equipment costs associated with boring or burying large conduits underground. Typically, 4 inch diameter conduits are installed in sections and spliced or connected at intermediate points along the proposed route.

The number of cables which can be installed in conventional duct systems is limited by the availability of unoccupied ducts or innerducts. As cables are installed into ducts or innerducts, the duct system's capacity for future cable installation is continuously reduced.

Also, the flexibility of conventional conduit systems is limited by the number of ducts or innerducts available at any given time after installed conduits become occupied with cables. As ducts or innerducts become occupied, they are difficult or impossible to recover for future cable installations. Obsolete media is typically abandoned, leaving these ducts or innerducts unusable.

Applicants have developed a novel cable assembly that will serve to overcome many of the referenced deficiencies of known duct systems and that provides reduced installation costs and greater flexibility due to its novel construction and performance features.

DISCLOSURE OF THE INVENTION

In accordance with the present invention, applicants provide a novel fiber optic cable assembly providing an air blown fiber (ABF) tube cable with a central innerduct. More specifically, the novel fiber optic cable assembly comprises a central innerduct for providing a pathway to install conventional cable by pulling of the cable therethrough. A plurality of air blown fiber (ABF) tubes are positioned around at least a portion of the circumference of the central innerduct to provide for installing air blown optical fiber bundles therethrough. A jacket is positioned around the plurality of air blown fiber (ABF) tubes to complete the fiber optic cable assembly. Most suitably, strength elements are positioned around the circumference of the central innerduct and interposed among the air blown fiber (ABF) tubes, and a layer of water-blocking material is provided between the air blown fiber tubes and the outer jacket of the fiber optic cable assembly.

It is therefore an object of the present invention to provide an improved air blown fiber (ABF) tube cable construction.

It is another object of the present invention to provide a fiber optic cable assembly that incorporates a central innerduct surrounded by multiple air blown fiber (ABF) tubes that provide for carrying both conventional cable and air blown fiber bundles in a single cable assembly so as to significantly reduce installation costs associated with installing conventional duct systems.

It is another object of the present invention to provide a fiber optic cable assembly comprising a central innerduct and a plurality of air blown fiber (ABF) tubes positioned around the circumference of the innerduct in order to provide for enhanced flexibility of use and re-use when compared with conventional conduit systems.

Some of the objects of the invention having been stated hereinabove, other objects will become evident as the description proceeds, when taken in connection with the accompanying drawings as described hereinbelow.

BEST MODE FOR CARRYING OUT THE INVENTION

Figure 1:
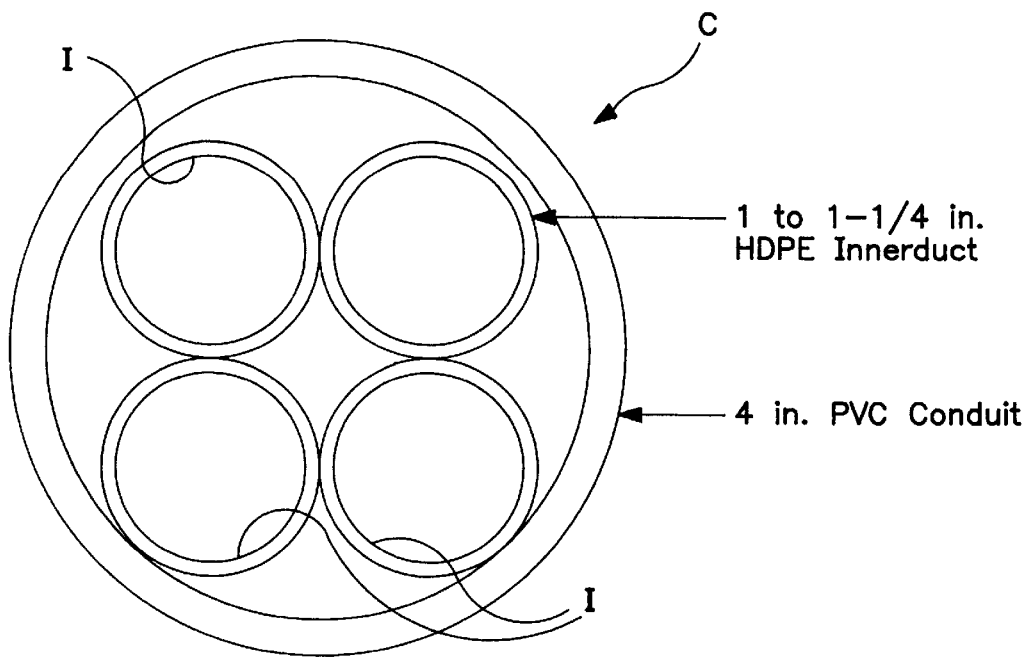
FIG. 1 is a schematic view of a conventional multiple duct system.

Referring now to the drawings, FIG. 1 illustrates a conventional multiple duct system capable of supporting installation of multiple cabling systems and providing for cabling system upgrade capability. The conventional duct system comprises one or more 4 inch polyvinyl chloride (PVC) conduits C which are installed by trenching or boring and multiple 1 to 1¼ inch high density polyethylene (HDPE) innerducts I therein which are then pulled into each PVC conduit. The shortcomings of the prior art duct system are set forth in the Related Art section above.

Figure 2:
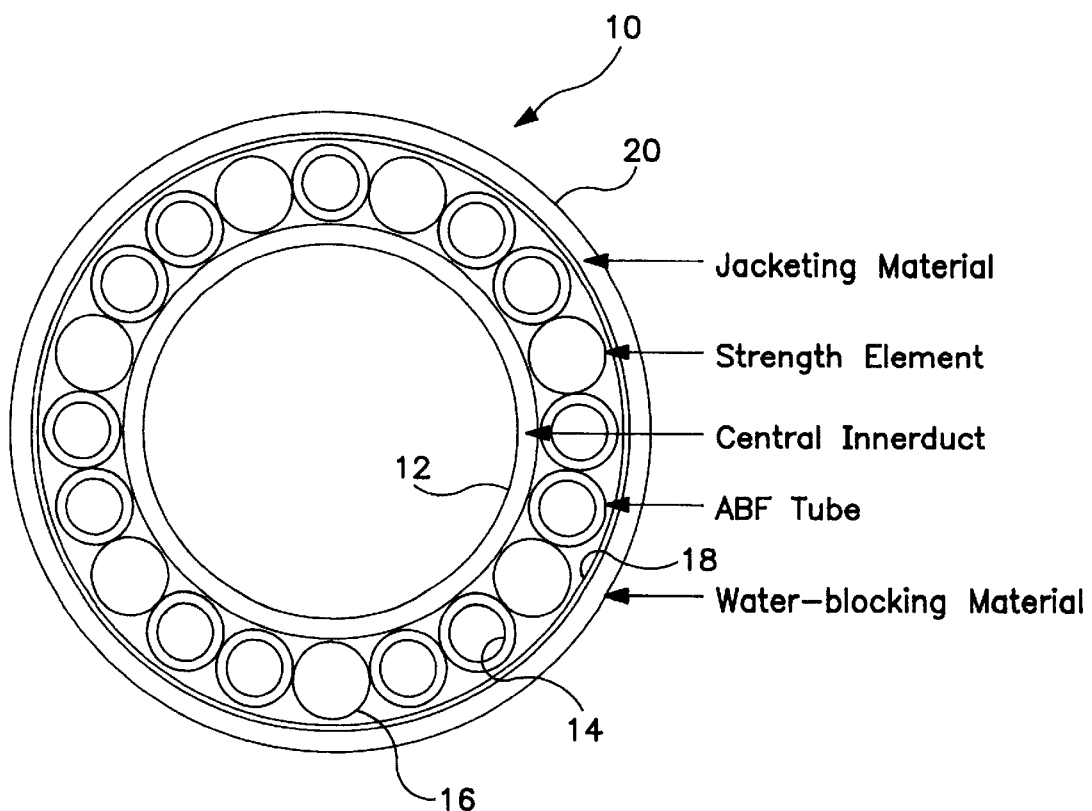
FIG. 2 is a schematic view of a representative fiber optic cable assembly providing a central innerduct and a plurality of air blown fiber (ABF) tubes therearound in accordance with the present invention.

FIG. 2 illustrates a preferred embodiment of applicants' invention that will serve to reduce installation costs and improve flexibility in contrast to the conventional multiple duct system shown in FIG. 1. The ABF tube cable with central innerduct 10 provides for significantly lower costs in installation and use by providing a single cable which incorporates central innerduct 12 surrounded by multiple ABF tubes 14, strength elements 16, a layer of water-blocking material 18, and a jacket 20 (see FIG. 1). The ABF tube cable with central innerduct 10 is installed using conventional boring or direct burial methods. Once cable 10 is installed, central innerduct 12 provides the pathway necessary to install (by pulling) a conventional cable (e.g., twisted pair/copper, coaxial, optical fiber or power cable), and ABF tubes 14 provide pathways for air blown fiber bundle installations. Strength elements 16 and water-blocking material layer 18 are contemplated as optional elements of the inventive assembly, but applicants contemplate their use in the preferred embodiment of the invention.

ABF tube cable with innerduct 10 most suitably is formed with central innerduct 12 having an inside diameter of between about 0.7 to 2.1 inches and most suitably between about 1.2 to 1.6 inches. Central innerduct 12 is most suitably formed of polyethylene or polyvinyl chloride (PVC), and cable assembly 10 most suitably includes between about 8 to 24 air blown fiber (ABF) tubes 14. Strength elements 16 are most preferably formed of fiber reinforced plastic rods or solid plastic rods, and water-blocking layer 18 between tubes 14 and jacket 20 preferably comprises super absorbent polymer coated tape. Jacket 20 suitably has an outside diameter of between about 1.6 and 3.3 inches.

Applicants have minimized installation costs by providing a single cable 10 to replace multiple conventional ducts. Cable 10 is installed in a single, continuous length by boring or placement in a trench. Thus, no intermediate splicing or connection is required. Additionally, cable 10 size is typically much smaller than conventional conduits, which reduces installation costs by requiring fewer passes with boring equipment or narrower trenches.

ABF tube cable with central innerduct 10 provides single innerduct 12 for conventional cable installation and multiple tubes 14 for air blown (optical) fiber bundle (ABF) installations. ABF bundles (not shown) are designed for quick and simple installation into tubes 14 and quick and simple de-installation from tubes 14. The ability to easily remove the ABF fiber bundles provides the capacity to quickly upgrade to different fiber types and/or fiber counts as needed without interrupting service on any other cables which have been installed previously in a selected ABF tube cable 10.

ABF tube cable with central innerduct 10 provides increased flexibility due to the inherent benefits of ABF technology. If and when previously installed ABF bundles become obsolete, they can be easily removed and replaced with bundles which support emerging media technologies by cable technicians.

ABF tube cable with innerduct 10 may be manufactured with several sheathing variations, including dielectric jackets 20 of polyethylene or PVC. Cable 10 may be armored with corrugated steel tape for rodent protection or with interlocked steel for extreme protection and compression resistance. In addition, innerduct 12 of cable assembly 10 will be selected to accommodate the type and size of cable planned for installation.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fiber optic cable assembly comprising:
   (a) a central innerduct adapted to provide a pathway for installing cable by pulling of said cable therethrough;
   (b) a plurality of air blown fiber (ABF) tubes positioned around at least a portion of the circumference of said central innerduct for installing air blown optical fiber bundles therethrough; and
   (c) a jacket positioned around said plurality of air blown fiber (ABF) tubes.

2. A fiber optic cable assembly according to claim 1, wherein said central innerduct defines an inside diameter of between about 0.70 to 2.1 inches and wherein said fiber optic cable jacket defines an outside diameter of between about 1.6 and 3.3 inches.

3. A fiber optic cable assembly according to claim 1, wherein said central innerduct is formed from polyethylene or polyvinyl chloride (PVC).

4. A fiber optic cable assembly according to claim 1, wherein said fiber optic cable comprises between about 8 to 24 air blown fiber (ABF) tubes.

5. A fiber optic cable assembly according to claim 1, wherein a plurality of strength elements are positioned around at least a portion of the circumference of said central innerduct and interposed among said plurality of air blown fiber (ABF) tubes.

6. A fiber optic cable assembly according to claim 5, wherein said strength elements are formed of fiber reinforced plastic rods or solid plastic rods.

7. A fiber optic cable assembly according to claim 1, including a layer of water blocking material positioned between said air blown fiber (ABF) tubes and said jacket.

8. A fiber optic cable assembly according to claim 1, wherein said jacket is formed of polyethylene or polyvinyl chloride (PVC).

9. A fiber optic cable assembly comprising:
   (a) a central innerduct having an inside diameter of between about 0.7 to 2.1 inches and adapted to provide a pathway for installing cable by pulling of said cable therethrough;
   (b) a plurality of air blown fiber (ABF) tubes positioned around at least a portion of the circumference of said central innerduct for installing air blown optical fiber bundles therethrough;
   (c) a plurality of strength elements positioned around at least a portion of the circumference of said central innerduct and interposed among said plurality of air blown fiber (ABF) tubes; and
   (d) a jacket positioned around said plurality of air blown fiber (ABF) tubes wherein said jacket defines an outside diameter of between about 1.6 to 3.3 inches.

10. A fiber optic cable assembly according to claim 9, wherein said central innerduct is formed from polyethylene or polyvinyl chloride (PVC).

11. A fiber optic cable assembly according to claim 9, wherein said fiber optic cable comprises between about 8 to 24 air blown fiber (ABF) tubes.

12. A fiber optic cable assembly according to claim 9, wherein said strength elements are formed of fiber reinforced plastic rods or solid plastic rods.

13. A fiber optic cable assembly according to claim 9, including a layer of water blocking material positioned between said air blown fiber (ABF) tubes and said jacket.

14. A fiber optic cable assembly according to claim 9, wherein said jacket is formed of polyethylene or polyvinyl chloride (PVC).

15. A fiber optic cable assembly according to claim 9, wherein said pulled cable is selected from the group consisting of communications optical fiber cable, communications copper cable or copper power cable.

* * * * *